United States Patent

Jäger et al.

[11] Patent Number: 5,459,246
[45] Date of Patent: Oct. 17, 1995

[54] REACTIVE DYESTUFFS CONTAINING HYDROXY NAPHTHALENE DISULPHONIC ACIDS

[75] Inventors: Horst Jäger; Klaus Wunderlich, both of Leverkusen, Germany

[73] Assignee: Bayer Aktiengesellschaft, Leverkusen, Germany

[21] Appl. No.: 58,073

[22] Filed: May 4, 1993

[30] Foreign Application Priority Data

May 11, 1992 [DE] Germany ............... 42 15 485.5

[51] Int. Cl.$^6$ ............... C09B 62/085; D06P 1/38
[52] U.S. Cl. ............... 534/635; 534/632; 534/638; 534/887; 534/634
[58] Field of Search ............... 534/632, 635, 534/638

[56] References Cited

U.S. PATENT DOCUMENTS

| | | | |
|---|---|---|---|
| 4,115,378 | 9/1978 | Bien et al. | 534/638 |
| 4,206,306 | 6/1980 | Bien et al. | 544/181 |
| 4,446,067 | 5/1984 | Jager et al. | 534/638 X |
| 4,808,706 | 2/1989 | Seiler | 534/635 X |
| 4,841,030 | 6/1989 | Jager | 534/638 |
| 4,879,372 | 11/1989 | Morimitsu et al. | 534/632 X |
| 4,906,737 | 3/1990 | Seiler et al. | 534/638 X |
| 4,937,326 | 6/1990 | Kayane et al. | 534/638 |
| 4,988,803 | 1/1991 | Stohr et al. | 534/635 |
| 5,149,791 | 9/1992 | Tzikas et al. | 534/638 |

FOREIGN PATENT DOCUMENTS

| | | | |
|---|---|---|---|
| 70806 | 1/1983 | European Pat. Off. | 534/638 |
| 74928 | 3/1983 | European Pat. Off. | 534/638 |
| 2655089 | 6/1978 | Germany | 534/638 |
| 2711150 | 9/1978 | Germany | 534/635 |
| 49-104923 | 10/1974 | Japan | 534/638 |
| 61-171770 | 8/1986 | Japan | 534/638 |

OTHER PUBLICATIONS

Sueda et al., Chemical Abstracts, vol. 82, No. 157821j (1975).
Morimitsu et al, Chemical Abstracts, vol. 106, No. 51690q (1987).
Abstract of JP 61-272269 (Dec. 2, 1986).

Primary Examiner—Johann Richter
Assistant Examiner—Fiona T. Powers
Attorney, Agent, or Firm—William C. Gerstenzang; Sprung Horn Kramer & Woods

[57] ABSTRACT

New reactive dyestuffs which, in the form of the free acid, correspond to the following formula

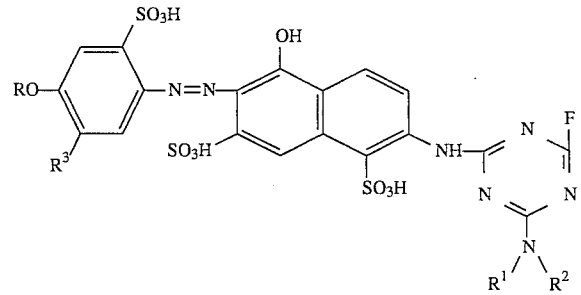

wherein the substituents have the meaning given in the description, are suitable for dyeing and printing materials containing hydroxyl groups or amide groups, in particular cellulose materials.

6 Claims, No Drawings

REACTIVE DYESTUFFS CONTAINING HYDROXY NAPHTHALENE DISULPHONIC ACIDS

The present invention relates to new reactive dyestuffs, a process for their preparation and their use.

Reactive dyestuffs which contain an azo compound of naphthalenesulphonic acids as the chromophore are already known from EP-A-299,315, DE-A-1,644,208 and JP-A-61 171,770.

The present invention relates to reactive dyestuffs which, in the form of the free acid, correspond to the following formula

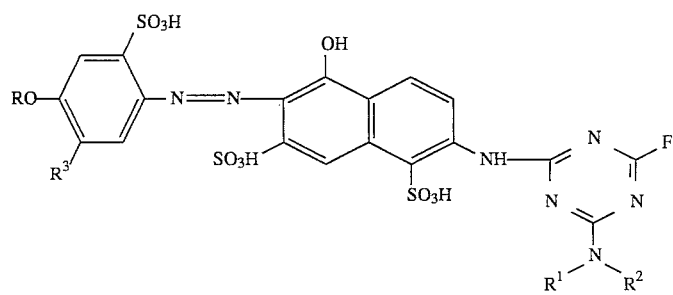

(1)

wherein

R=$CH_3$ or $C_2H_5$, $R^1$=hydrogen or an aliphatic, cycloaliphatic or araliphatic radical, $R^2$=a radical mentioned under $R^1$ or a heteroaryl radical or a phenyl radical, wherein the radicals $R^1$ and $R^2$, optionally including a further hetero atom, can form a ring, and $R^3$=H or $SO_3H$.

Further hetero atoms for ring formation of $R^2$ and $R^1$ are preferably O, NH, $NCH_3$, $NCOCH_3$, N—$C_2H_4SO_2CH=CH_2$, S, SO and $SO_2$.

Preferred heteroaryl radicals $R^2$ and $R^1$ are 3-aminosulpholane, 2-aminothiazole and 6-amino-2-ethylsulphonylbenzothiazole.

In a preferred embodiment, —$NR^1R^2$ represents the radical of an aliphatic amine, or of a heterocyclic amine in which $R^1$ and $R^2$ together with the common N atom, form a ring.

Examples of substituents are: OH, Cl, F, COOH, $SO_3H$, $OSO_3H$, $SO_2CH=CH_2$, CN, $SO_2CH_2CH_2Cl$, $SO_2CH_2CH_2SO_3H$ and NR*—Z, wherein Z represents a heterocyclic reactive group, in particular one of the group comprising the monochloro- and the monofluorotriazine series or of the fluoropyrimidine series.

The cycloaliphatic radicals $R^1$ are, in particular, 5- or 6-membered cycloalkyl radicals.

The araliphatic radicals $R^1$ are, in particular, those of the formula

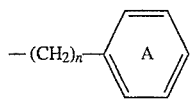

wherein n=1–4 and the radical A can be substituted, for example by Cl, $NO_2$, COOH, $SO_3H$, $CH_3$, $OCH_3$, $SO_2CH_2CH_2OSO_3H$ or $SO_2CH=CH_2$, $CH_2SO_2CH_2CH_2OSO_3H$.

Examples of substituents of the phenyl radicals $R^2$ are: $OCH_3$, $OC_2H_5$, $OCH_2CH_2OH$, $CH_3$, $C_2H_5$, —$CH(CH_3)_2$, F, Cl, Br, COOH, $SO_3H$, $NO_2$, $SO_2CH_2CH_2OSO_3H$, $SO_2CH=CH_2$, $CH_2SO_2CH_2CH_2OSO_3H$, $CH_2SO_2CH=CH_2$ and NHZ.

The following examples may be mentioned specifically for $R^1$ or $R^2$=an aliphatic radical:

$CH_3$, $C_2H_5$, $CH_2CH_2OH$, $CH_2CH_2OCH_3$, $CH_2CH_2OC_2H_5$, $CH_2CH_2OCH_2CH_2OH$, $CH_2SO_3H$, $CH_2CH_2SO_3H$, $CH_2CH_2OSO_3H$, $CH_2COOH$, $CH_2CH_2COOH$, $CH_2CH_2SO_2CH_2CH_2OSO_3H$, $CH_2CH_2OCH_2CH_2SO_2CH_2CH_2Cl$, $CH_2CH_2OCH_2CH_2SO_2CH=CH_2$,

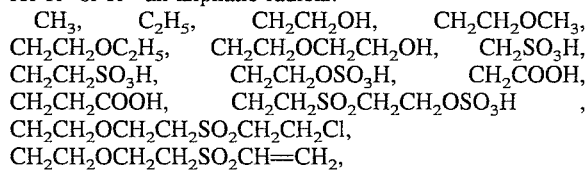

$CH_2CH_2NHCOCH_2CH_2COOH$,
$CH_2CH_2CH_2SO_2CH_2CH_2OSO_3H$,
$CH_2CH_2CH_2SO_2CH=CH_2$, $CH_2CH_2CH_2SO_2CH_2CH_2Cl$,

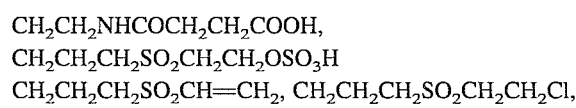

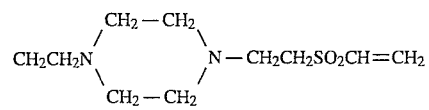

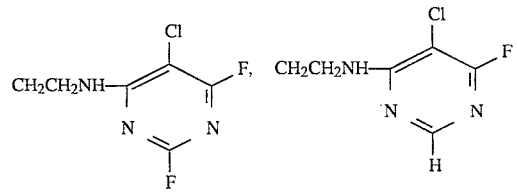

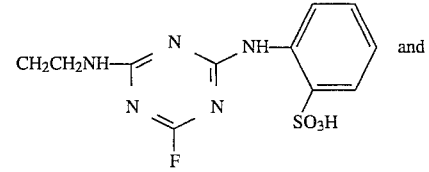

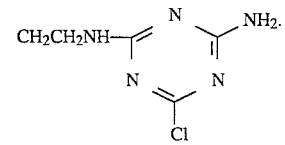

Examples of cycloaliphatic radicals $R^1$ and $R^2$ are:

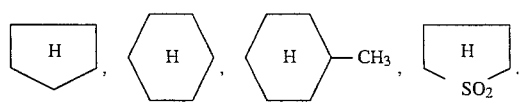

Araliphatic radicals $R^1$ are, for example,

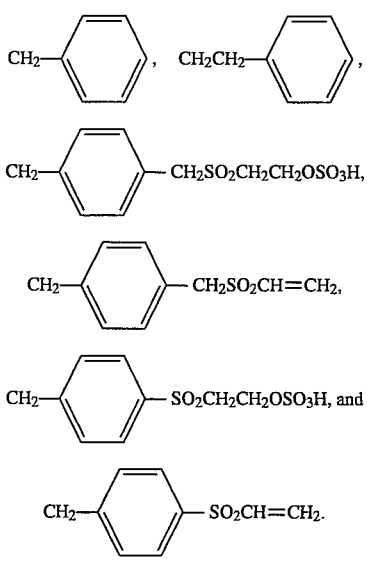

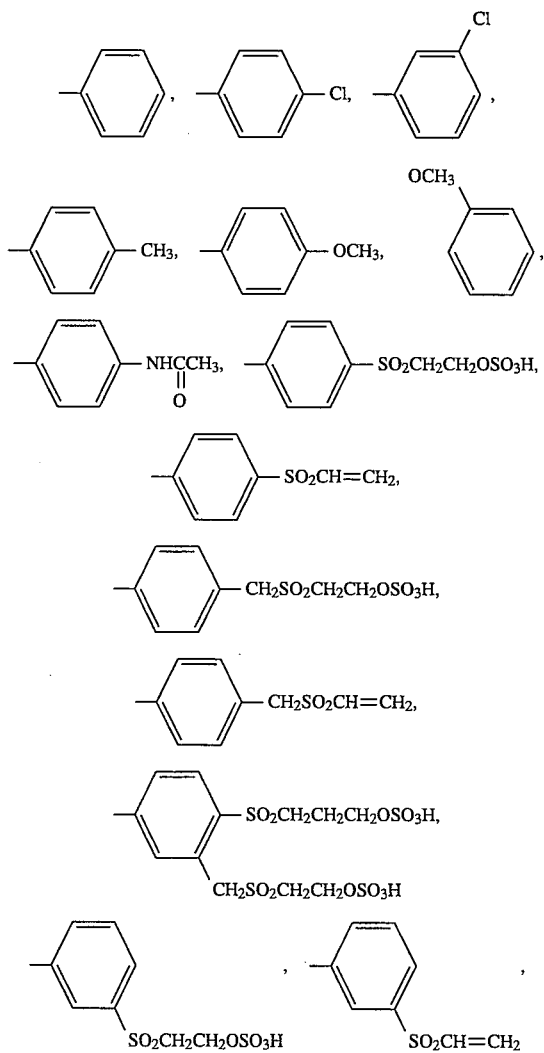

The following radicals may be mentioned as examples of phenyl radicals $R^2$:

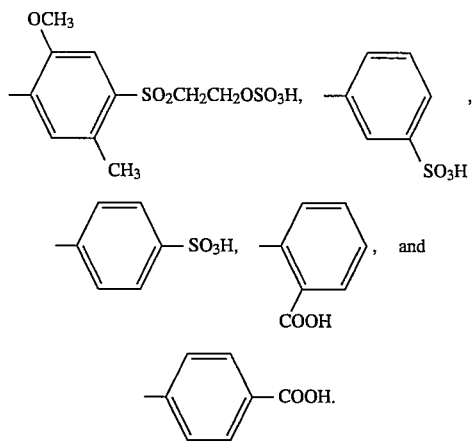

Examples of cyclic radicals

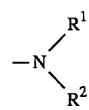

are

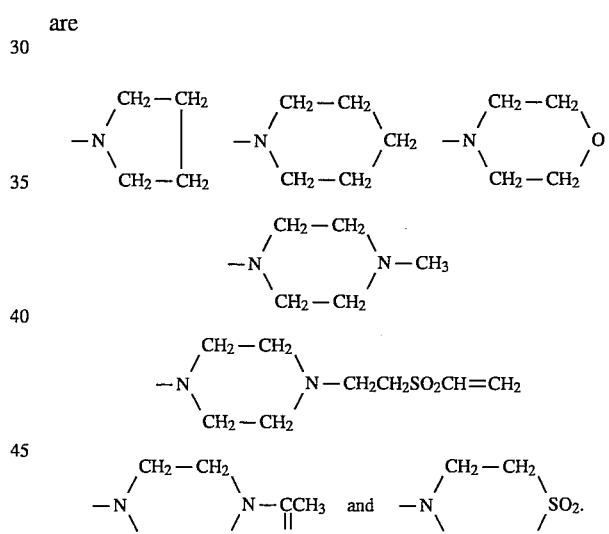

Preferred compounds in the context of the formula (1) are those compounds in which $R^3$ represents hydrogen.

Compounds which are furthermore preferred are those in which $R^1$ and $R^2$ independently of one another denote hydrogen or $C_1$–$C_4$-alkyl, which can be substituted by $OCH_3$, $OC_2H_5$, COOH, $OSO_3H$, $SO_3H$, $OCH_2CH_2SO_2CH_2CH_2OSO_3H$, $OCH_2CH_2SO_2CH=CH_2$, $OCH_2CH_2SO_2CH_2CH_2Cl$, $SO_2CH_2CH_2OSO_3H$ or $SO_2CH=CH_2$; in a further preferred embodiment, $R^1$ denotes hydrogen or $C_1$–$C_4$-alkyl and $R^2$ denotes a phenyl radical, which can be substituted by Cl, $OCH_3$, $CH_3$, $SO_3H$, $NO_2$, COOH, CN, $SO_2CH_2CH_2OSO_3H$, $SO_2CH=CH_2$, $CH_2SO_2CH_2CH_2OSO_3H$ or $CH_2SO_2CH=CH_2$; in a further preferred embodiment,

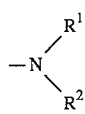

represents the radical of a cyclic amine, in particular

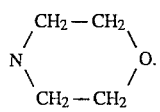

The invention furthermore relates to a process for the preparation of the dyestuffs of the formula (1), which is characterised in that 2-amino-5-hydroxynaphthalene-1,7-disulphonic acid is first subjected to a condensation reaction with trifluorotriazine in the pH range of 2–6, in particular 3–5, and at temperatures of −5° to +20°, in particular at 0°–5°, if appropriate in the presence of a buffer, to give a difluorotriazine compound, a further fluorine atom is subsequently replaced by an amine radical $NR^1R^2$, and, finally the resulting monofluoro compound of the formula

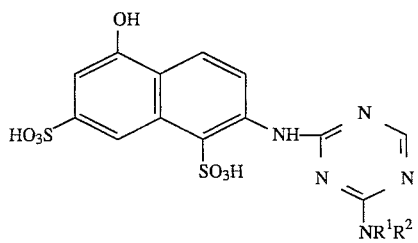

is coupled to the diazo compound of an amine of the formula

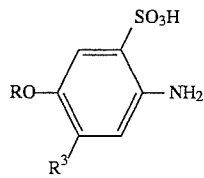

in the neutral range. Possible buffers are, in particular, the alkali metal salts of fluorides or phosphates.

The reactive dyestuffs of the formula (1) can be isolated and processed to usable, dry dye preparations. The isolation is preferably carried out at the lowest possible temperatures by salting out and filtration. If appropriate, the filtered dyestuffs can be dried by addition of a buffer mixture, for example mono- or disodium phosphate; drying is preferably carried out at temperatures which are not too high and under reduced pressure. In certain cases, the dry preparations according to the invention can be prepared directly, that is to say without intermediate isolation of the dyestuffs, by spray drying the entire mixture prepared.

The new dyestuffs are suitable for dyeing and printing materials containing hydroxyl and amide groups, in particular cellulose materials. They are distinguished by a high reactivity and a high degree of fixing. The dyeings or prints obtainable on cellulose materials with these dyestuffs moreover are distinguished by a high stability of the fibre/dyestuff bond and by an outstanding stability towards oxidising agents, such as detergents containing peroxide or chlorine. The ease of washing out the hydrolysis products formed to only a minor degree during dyeing or printing is excellent. The dyestuffs have good wet fastness properties.

The formulae shown are those of the free acids. The salts, in particular the alkali metal salts, such as sodium, potassium or lithium salts, are in general obtained in the preparation.

The weights mentioned in the examples relate to the free acids. The colour code numbers given in the examples relate to the Colour Index Hue Indication Chart (Indicator Numbers).

EXAMPLE 1

31.9 g of 2-amino-5-hydroxy-naphthalene-1,7-disulphonic acid are dissolved in 400 ml of water to give a neutral solution. 300 g of ice are then added, and 8.8 ml of trifluorotriazine are allowed to run in, a pH of 4.0–4.5 being maintained with 15% strength sodium carbonate solution. The mixture is subsequently stirred for 5 minutes, 8.7 g of morpholine are then added, and a pH of 7.5–8 is maintained with 15% sodium carbonate solution. After 10 minutes at 10° C., the reaction has ended. The reaction product of the formula

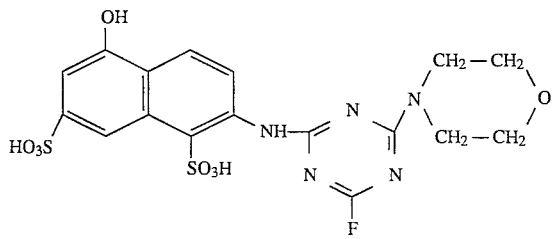

has partly precipitated.

A diazo compound obtained by the customary route by direct diazotisation of 20.3 g of 1-amino-4-methoxy-benzene- 2-sulphonic acid is added to this suspension at 5°–10° C., the pH simultaneously being kept at pH 7.0–7.5 by sprinkling in sodium bicarbonate. When the coupling has ended, the dyestuff of the formula

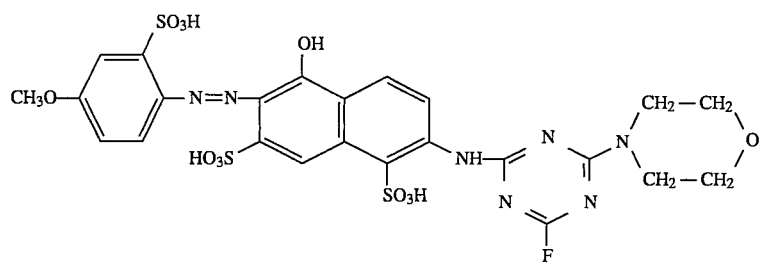

is salted out, filtered off with suction, dried and ground. The red dyestuff powder dissolves readily in water and dyes cotton a clear scarlet (colour code number by a process customary for reactive dyestuffs.

Further valuable dyestuffs which dye cotton a clear scarlet are obtained as described in Example 1 if, instead of morpholine, an equivalent amount of the amines listed below is used.

| Example | Amine |
| --- | --- |
| 2 | Methylamine |
| 3 | Ethylamine |
| 4 | Dimethylamine |
| 5 | Diethylamine |
| 6 | Isopropylamine |
| 7 | Aminoacetic acid |
| 8 | Taurine |
| 9 | N-Methyltaurine |
| 10 | Methylaminoacetic acid |
| 11 | β-Sulphatoethylamine |
| 12 | β-Sulphatoethyl-β-aminoethyl-sulphone |
| 13 | β-Sulphatoethyl-γ-aminopropyl-sulphone |
| 14 | β-Methoxyethylamine |
| 15 | β-Aminopropionic acid |
| 16 | Methylaminomethanesulphonic acid |
| 17 | Ethylaminomethanesulphonic acid |
| 18 | $H_2NCH_2CH_2OCH_2CH_2SO_2CH_2CH_2OSO_3H$ |
| 19 | $H_2NCH_2CH_2OCH_2CH_2SO_2CH=CH_2$ |
| 20 | $H_2NCH_2CH_2OCH_2CH_2SO_2CH_2CH_2Cl$ |
| 21 | N-Methylbenzylamine |
| 22 | 1-(β-Aminoethyl)-4-(β-sulphatoethyl-sulphonyl)-benzene |
| 23 | H₂N—[H, SO₂] |
| 24 | Cyclohexylamine |
| 25 | Ethanolamine |
| 26 | N-Methylethanolamine |
| 27 | Diethanolamine |
| 28 | 3-Methoxypropylamine |

EXAMPLE 29

31.9 g of 2-amino-5-hydroxy-naphthalene-1,7-disulphonic acid are dissolved in 400 ml of water to give a neutral solution. 300 g of ice are then added, and 8.8 ml of trifluorotriazine are allowed to run in, a pH of 4.0–4.5 being maintained with 15% strength sodium carbonate solution. The mixture is subsequently stirred for 5 minutes, a neutral solution of 17.3 g of m-sulphanilic acid is then added, and a pH of 5.0–5.5 is maintained with 15% strength sodium carbonate solution. During the acylation, the temperature is allowed to rise to 15°–20°. A diazo compound obtained by the customary route by diazotisation of 20.3 g of 1-amino-4-methoxy-benzene-2-sulphonic acid is added to the resulting solution of the reaction product of the formula

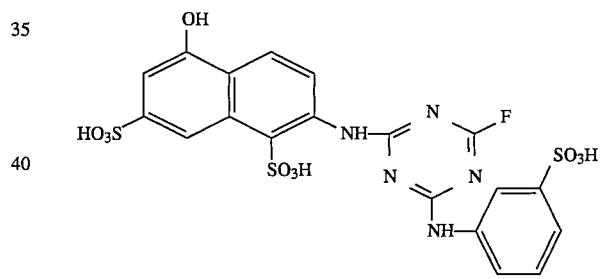

at 5°–10°, the pH simultaneously being kept at pH 7.0–7.5 by sprinkling in sodium bicarbonate. When the coupling has ended, the dyestuff of the formula

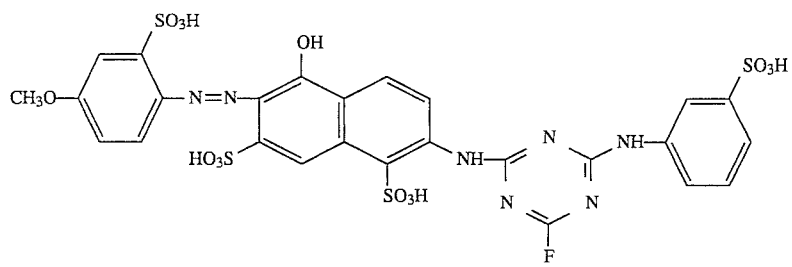

is salted out, filtered off with suction, dried and ground. The red dyestuff powder dissolves readily in water and dyes cotton a clear scarlet (colour code number 6) by a process customary for reactive dyestuffs.

Further valuable dyestuffs which dye cotton a clear scarlet are obtained as described in Example 29 if, instead of m-sulphanilic acid, an equivalent amount of the amines listed below is used.

| Example | Amine |
|---|---|
| 30 | Aniline |
| 31 | N-Ethylaniline |
| 32 | N-Methylaniline |
| 33 | 4-Chloroaniline |
| 34 | 3-Chloroaniline |
| 35 | 2-Chloroaniline |
| 36 | o-Toluidine |
| 37 | p-Toluidine |
| 38 | p-Sulphanilic acid |
| 39 | o-Anisidine |
| 40 | p-Anisidine |
| 41 | 4-β-Sulphatoethylsulphonylaniline |
| 42 | 3-β-Sulphatoethylsulphonylaniline |
| 43 | β-Sulphatoethyl-4-aminobenzylsulphone |
| 44 | 3-Aminobenzoic acid |
| 45 | 4-Aminobenzoic acid |
| 46 | 1-Amino-4-methyl-3-β-sulphatoethyl-sulphonyl-benzene |
| 47 | 1-Amino-4-vinylsulphonyl-benzene |
| 48 | 1-Amino-3-vinylsulphonyl-benzene |

EXAMPLE 49

31.9 g of 2-amino-5-hydroxy-naphthalene-1,7-disulphonic acid are subjected to a condensation reaction with trifluorotriazine and then with morpholine as described in Example 1. A diazo compound obtained by the customary route by direct diazotisation of 28.3 g of 1-amino-4-methoxy-benzene- 2,5-disulphonic acid is added to the resulting suspension of the monofluorotriazinyl compound at 5°–10°, the pH simultaneously being kept at 7.0–7.5 by sprinkling in sodium bicarbonate. When the coupling has ended, the dyestuff of the formula

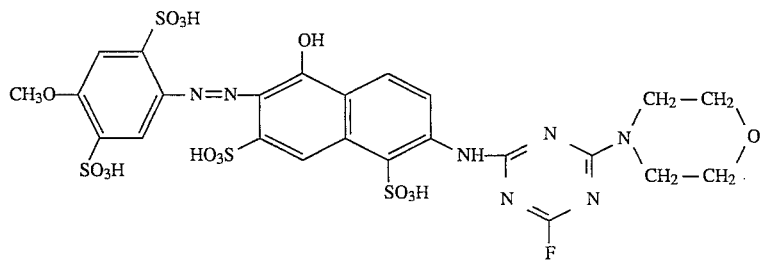

is salted out, filtered off with suction, dried and ground. The red dyestuff powder dissolves readily in water and dyes cotton a brilliant reddish-tinged orange (colour code number 5).

If the procedure is as described in this example, but, instead of morpholine, an equivalent amount of the amines mentioned in Examples 2–28 or 29–48 is used, a pH of 5.0–5.5 being maintained during the condensation with the difluorotriazine compound for the aromatic amines mentioned last, reactive dyestuffs which dye cotton scarlet (colour code number 6) similarly result.

EXAMPLE 50

31.9 g of 2-amino-5-hydroxy-naphthalene-1,7-disulphonic acid are subjected to a condensation reaction with trifluorotriazine as described in Example 1. 5.0 g of ethylenediamine are added to the solution of the resulting difluorotriazine compound at 0°, a pH of 5.5–6.5 being maintained. The condensation has ended after 2 to 3 hours. A diazo compound obtained by the customary route by diazotisation of 30.3 g of 2-amino-naphthalene-1,5-disulphonic acid is added to the reaction product of the formula

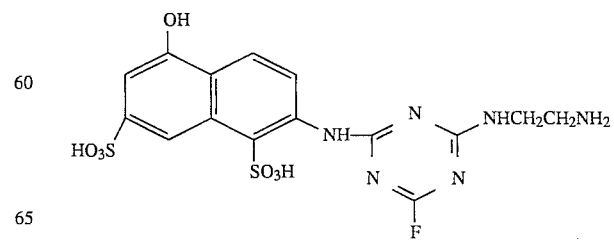

which is largely present as a suspension, the pH simultaneously being kept at pH 7.0–7.5 by sprinkling in sodium bicarbonate. When the coupling has ended, the dyestuff of the formula

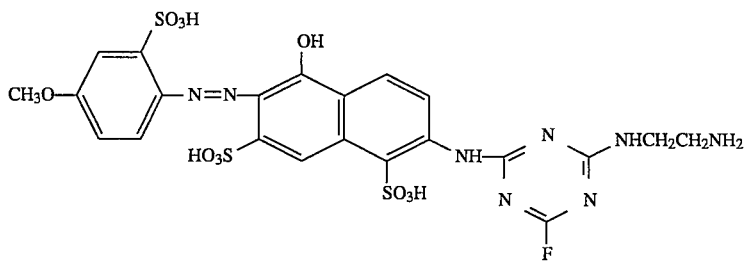

which has precipitated as a sparingly soluble product, is filtered off with suction and stirred in 1 l of water again. 16.9 g of 2,4,6-trifluoro-5-chloro-pyrimidine are added dropwise at 0°–5°, during which a pH of 7.5–8.0 is maintained with dilute sodium hydroxide solution. The dyestuff dissolves during the condensation reaction. When the condensation has ended (thin layer chromatogram), the dyestuff is salted out, filtered off with suction, dried and ground. The red powder dissolves readily in water and dyes cotton a clear scarlet (colour code number 6).

Further valuable reactive dyestuffs which dye cotton scarlet are obtained as described in this example if, instead of 2,4,6-trifluoro-5-chloropyrimidine, an equivalent amount of the reactive components listed below is used and the condensation reaction is carried out in the temperature range stated.

| Example | Reactive component | Temperature °C. |
|---------|-------------------|-----------------|
| 51 | 4,6-Difluoro-5-chloropyrimidine | 1–15° |
| 52 | 2,4-Dichloro-6-aminotriazine | 25–30° |
| 53 | 2,4-Dichloro-6-(2-sulphophenyl-amino)-triazine | 25–30° |
| 54 | 2,4-Dichloro-6-(2-sulphophenyl-amino)-triazine | 0–5° |
| 55 | 2,4-Difluoro-6-(2-chloro-5-sulphophenylamino)-triazine | 0–5° |
| 56 | 2,4-Difluoro-6-aminotriazine | 0–5° |

We claim:

1. Reactive dyestuff which, in the form of the free acid, corresponds to the following formula

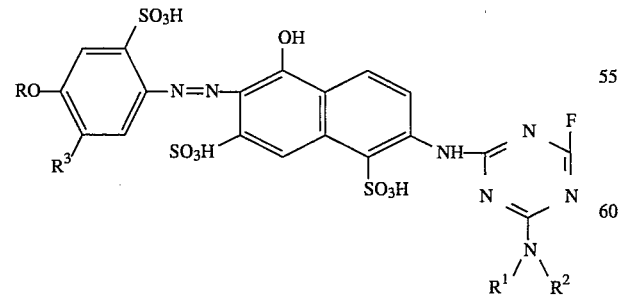

wherein $R=CH_3$ or $C_2H_5$, $R^1$ and $R^2$, optionally including a further hetero atom, form a heterocyclic ring:

$R^3=H$ or $SO_3H$.

2. Reactive dyestuff according to claim 1, wherein $R=CH_3$.

3. Reactive dyestuff according to claim 1, wherein $R^1$ and $R^2$, optionally including a further hetero atom, form a heterocyclic 5- or 6-membered ring.

4. Reactive dyestuff according to claim 1, wherein

denotes the radical of the formula

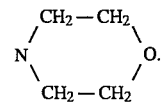

5. Reactive dyestuff according to claim 1, of the formula

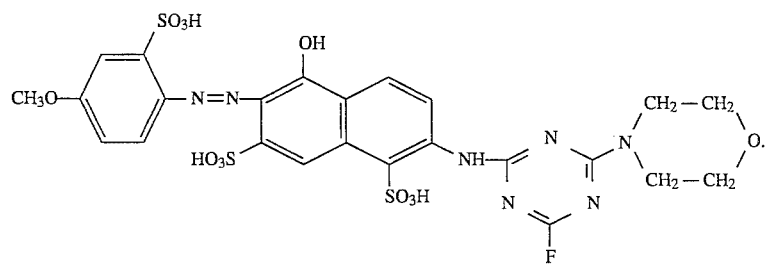
6. Process for dyeing or printing materials containing hydroxyl or amide groups with a reactive dyestuff, by applying thereto a reactive dyestuff according to claim 1 is used.
* * * * *

UNITED STATES PATENT AND TRADEMARK OFFICE
CERTIFICATE OF CORRECTION

PATENT NO. : 5,459,246
DATED : October 17, 1995
INVENTOR(S) : Jager, et al.

It is certified that error appears in the above-identified patent and that said Letters Patent is hereby corrected as shown below:

Col. 13, Last two lines     Delete " is used "

Signed and Sealed this

Sixteenth Day of April, 1996

Attest:

BRUCE LEHMAN

*Attesting Officer*     Commissioner of Patents and Trademarks